United States Patent
Windridge et al.

(10) Patent No.: US 9,947,156 B2
(45) Date of Patent: Apr. 17, 2018

(54) GRANTING CONTROL OF A SHARED SYSTEM

(71) Applicant: PHILIPS LIGHTING HOLDING B.V., Eindhoven (NL)

(72) Inventors: Melanie Jane Windridge, Amersham (GB); Julian Charles Nolan, Pully (CH); Alexander Henricus Waltherus Van Eeuwijk, Eindhoven (NL); Cornelis Jojakim Jalink, Utrecht (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/436,788

(22) PCT Filed: Oct. 11, 2013

(86) PCT No.: PCT/IB2013/059308
§ 371 (c)(1),
(2) Date: Apr. 17, 2015

(87) PCT Pub. No.: WO2014/060920
PCT Pub. Date: Apr. 24, 2014

(65) Prior Publication Data
US 2016/0180617 A1    Jun. 23, 2016

Related U.S. Application Data

(60) Provisional application No. 61/714,874, filed on Oct. 17, 2012.

(51) Int. Cl.
| | |
|---|---|
| G07C 9/00 | (2006.01) |
| H04L 29/08 | (2006.01) |
| H04L 12/28 | (2006.01) |
| H05B 37/02 | (2006.01) |

(Continued)

(52) U.S. Cl.
CPC ...... G07C 9/00134 (2013.01); H04L 12/2803 (2013.01); H04L 12/2838 (2013.01);
(Continued)

(58) Field of Classification Search
CPC ............. H04L 12/2827; H04L 12/2803; H04L 12/2838; H04L 67/22; G06F 21/31;
(Continued)

(56) References Cited

U.S. PATENT DOCUMENTS

| | | | |
|---|---|---|---|
| 2002/0091947 A1 | 7/2002 | Nakamura | |
| 2003/0057887 A1* | 3/2003 | Dowling | H05B 37/0245 315/291 |

(Continued)

FOREIGN PATENT DOCUMENTS

| | | |
|---|---|---|
| DE | 102006016268 A1 | 10/2007 |
| JP | 2003242229 A | 8/2003 |

(Continued)

*Primary Examiner* — Thomas Alunkal

(57) ABSTRACT

Method and apparatus for granting control of a shared-access system. The method comprises: obtaining (305) an identity of a user; obtaining (310, 315) a priority rating associated with the user, wherein the priority rating is updated in response to one or more observed activities of the user, the one or more observed activities being linked to the shared-access system (100); comparing the priority rating with a threshold; and granting (320) control of at least a part of the shared-access system (100) to the user if the priority rating is above the threshold. For example, each user may have a respective 'strength of association' with the shared-access system or part thereof; the shared-access system may comprise one or more lighting units arranged to illuminate an environment, and a user who is present most often in the environment may be deemed to have the 'strongest association' with the shared-access system.

14 Claims, 4 Drawing Sheets

(51) Int. Cl.
*H04M 15/00* (2006.01)
*H04W 4/02* (2018.01)

(52) U.S. Cl.
CPC ............ *H04L 67/22* (2013.01); *H04M 15/68* (2013.01); *H04W 4/021* (2013.01); *H05B 37/0245* (2013.01); *Y02B 20/445* (2013.01)

(58) Field of Classification Search
CPC ............ G06F 1/3231; G06F 17/30038; G06F 21/604; G06F 2221/2141; G07C 9/00134; H04M 4/021; H05B 37/0245; Y02B 20/445
USPC .......................................... 340/5.54, 5.7, 5.8
See application file for complete search history.

(56) References Cited

U.S. PATENT DOCUMENTS

| | | | |
|---|---|---|---|
| 2003/0227439 A1 | 12/2003 | Lee et al. | |
| 2008/0016214 A1* | 1/2008 | Galluzzo | H04L 67/322 709/226 |
| 2010/0097225 A1* | 4/2010 | Petricoin, Jr. | G07C 9/00111 340/573.1 |
| 2010/0301776 A1* | 12/2010 | Feri | H05B 37/0272 315/312 |
| 2011/0093939 A1 | 4/2011 | Barbour et al. | |
| 2012/0075054 A1 | 3/2012 | Ge et al. | |
| 2012/0077171 A1* | 3/2012 | Rubio | G10H 1/361 434/307 A |
| 2015/0048742 A1* | 2/2015 | Wingren | H05B 37/0218 315/152 |
| 2015/0161137 A1* | 6/2015 | Lashina | G06F 17/3053 707/749 |

FOREIGN PATENT DOCUMENTS

| | | |
|---|---|---|
| JP | 2012514829 A | 6/2012 |
| RU | 2010106610 A | 9/2011 |
| WO | 0039964 A1 | 7/2000 |
| WO | 2010092510 A1 | 8/2010 |
| WO | WO2010143089 A1 | 12/2010 |
| WO | 2011001320 A1 | 1/2011 |

* cited by examiner

GRANTING CONTROL OF A SHARED SYSTEM

CROSS-REFERENCE TO PRIOR APPLICATIONS

This application is the U.S. National Phase application under 35 U.S.C. § 371 of International Application No. PCT/IB2013/059308, filed on Oct. 11, 2013, which claims the benefit of U.S. Provisional Patent Application No. 61/714,874, filed on Oct. 17, 2012. These applications are hereby incorporated by reference herein.

TECHNICAL FIELD

The invention relates to control of a shared-access system, such as a lighting system, and more particularly to methods and apparatus for granting control of the shared-access system.

BACKGROUND OF THE INVENTION

There are numerous systems, such as lighting systems, which can be controlled by multiple users. In a conventional lighting system, for example, there might be a single controller which any user is free to operate in order to control the lighting system. For instance, a user may operate the controller to set a desired dim level for one or more light sources in the lighting system.

United States Patent Application US 2003/0227439 A1 proposes a method of controlling a home lighting system based on stored 'preferences' of users associated with the system, e.g. preferred dim levels, preferred lighting colors and/or preferred illumination patterns. The method involves receiving and processing image data captured by cameras mounted in the home, and identifying the users in the image data. The system is configured to respond to identifying one of the users by automatically implementing one or more preferences of the identified user. The patent application proposes to use preconfigured priority rules to determine how the system should respond when it is not clear which user preferences to apply, e.g. when it identifies two or more of the users in the same location at the same time. For instance, a parent's preferences may be used to configure the lighting system, rather than his or her child's preferences.

Future lighting systems may be controllable via users' personal handheld computing devices, e.g. via their smartphones, for automatically applying predefined user preferences and/or for granting manual control to the users. This may be problematic in a public lighting system, for example, since several users may make conflicting attempts to control the lighting system via their smartphones. It is likely that using preconfigured priority rules would be an inconvenient solution to this problem in some public lighting systems, due to a potential need for ongoing manual reconfiguration of the priority rules to reflect changing priorities. In lighting systems that could have very many users, for instance in a busy café or student common room, a solution based on preconfigured priority rules may be impracticable.

The issue is not limited to public lighting systems, but in principle could be relevant to almost any shared-access system. There are significant technical challenges involved in determining which user should be able to control such a system, and under which circumstances.

SUMMARY OF THE INVENTION

An object of the invention is to provide a method of granting control of a shared-access system, such as a lighting system, which can potentially be used in small and very large systems alike, and which does not require ongoing manual reconfiguration.

A first aspect of the invention provides a method of granting control of at least a part of the shared-access system, as recited in claim 1. Said part may be a subsystem or sub-network of the shared-access system; for example, the shared-access system may be a network of respective lighting systems installed in various coffee shops, wherein each lighting system is a part of the network.

In an embodiment, a controller performing this method employs dynamically adapted criteria for permitting a user to control the shared-access system, based on empirical data pertaining to the user's activities. Thus, the controller need not be preprogrammed with rules for determining which user should be permitted to control the shared-access system in a given circumstance—these are 'learned' through observation. It will be appreciated that embodiments of the claimed method can be employed in small and very large systems alike.

It is envisaged that, according to the method, each user will have a respective 'strength of association' with the shared-access system or part thereof. For instance, in an embodiment where the shared-access system comprises one or more lighting units arranged to illuminate an environment, the user who is present most often in the environment may be deemed to have the 'strongest association' with the shared-access system.

The threshold that a user's priority rating must exceed in order to be granted control of the shared-access system may be based on the priority rating of another user. Thus, for instance, if two users make conflicting attempts to control the shared-access system then the controller will grant control to the user with the 'stronger association' to the shared-access system (i.e. the higher priority rating), and deny control to the other user. The threshold may require an absolute minimum priority rating, below which a user will not be granted control of the shared-access system even if his or her priority rating is the highest of all users wishing to control it (or her or she is the only user wishing to control it).

The skilled person will appreciate numerous observed activities of a user which are compatible with the method. Being present in a predefined area associated with the shared-access system is one such activity. For instance, if a user often visits a particular coffee shop (i.e. is often present in the coffee shop) then the user may thereby increase his or her 'strength of association' with a shared-access system of the coffee shop, such as a lighting system and/or an audio system. There may even be a prioritized part of the predefined area, e.g. a members-only area of the coffee shop, which may further increase a user's priority rating compared with being present in a non-prioritized part of the predefined area.

Another type of suitable observed activity is making one or more purchases linked to the shared-access system. Returning to the coffee shop example, a user may increase his or her priority rating by purchasing a coffee, or by purchasing a number of coffees per visit to the coffee shop. Thus the user who buys the most coffee may have the 'strongest association' with a shared-access system of the coffee shop. The purchase may be indirectly linked to the shared-access system; for example, a user may increase his or her priority rating by purchasing an item in a store which is somehow affiliated with a coffee shop in which the shared-access system is installed.

The one or more observed activities of the user may be indirectly linked to the shared-access system, and/or may be linked to only a part of the shared-access system. For instance, becoming associated with the shared-access system and/or a proprietor thereof, e.g. on an Internet-based networking site, is an example of an observed activity of a user which is compatible with the method. Returning again to the coffee shop example, a user may "follow" the coffee shop on Twitter and thereby increase his or her 'strength of association' with a shared-access system of the coffee shop. Similarly, the user may become a "friend" of the coffee shop (and/or its proprietor) on Facebook, or may become a LinkedIn "connection" of the coffee shop (and/or its proprietor).

A user's interactions with the shared-access system may be relevant 'observed activities' per se for updating the user's priority rating. For instance, one or more of the following may be taken into account when updating the priority rating of a user: the number of times a user controls the shared-access system; the manner in which the user controls the shared-access system, e.g. via a portable device or via an integral controller of the shared-access system; and the settings that the user applies to the shared-access system.

Granting control of the shared-access system to the user may comprise automatically controlling the shared-access system in accordance with predefined settings associated with the user. In the coffee shop example, this may include automatically configuring one or more lighting units to provide a preferred illumination effect, and/or automatically switching the audio system to a favorite playlist of the user.

Granting control of the shared-access system to the user may comprise enabling the user to provide one or more settings for controlling the shared-access system. In the coffee shop example, a controller of the shared-access system may communicate with a device (e.g. a smartphone or tablet computer) associated with the user, whereby the device will present a user interface for the user to control the shared-access system, e.g. the audio system and/or lighting system.

These and other aspects of the invention will be apparent from and elucidated with reference to the embodiments described hereinafter.

DESCRIPTION OF EMBODIMENTS

Figure 1:
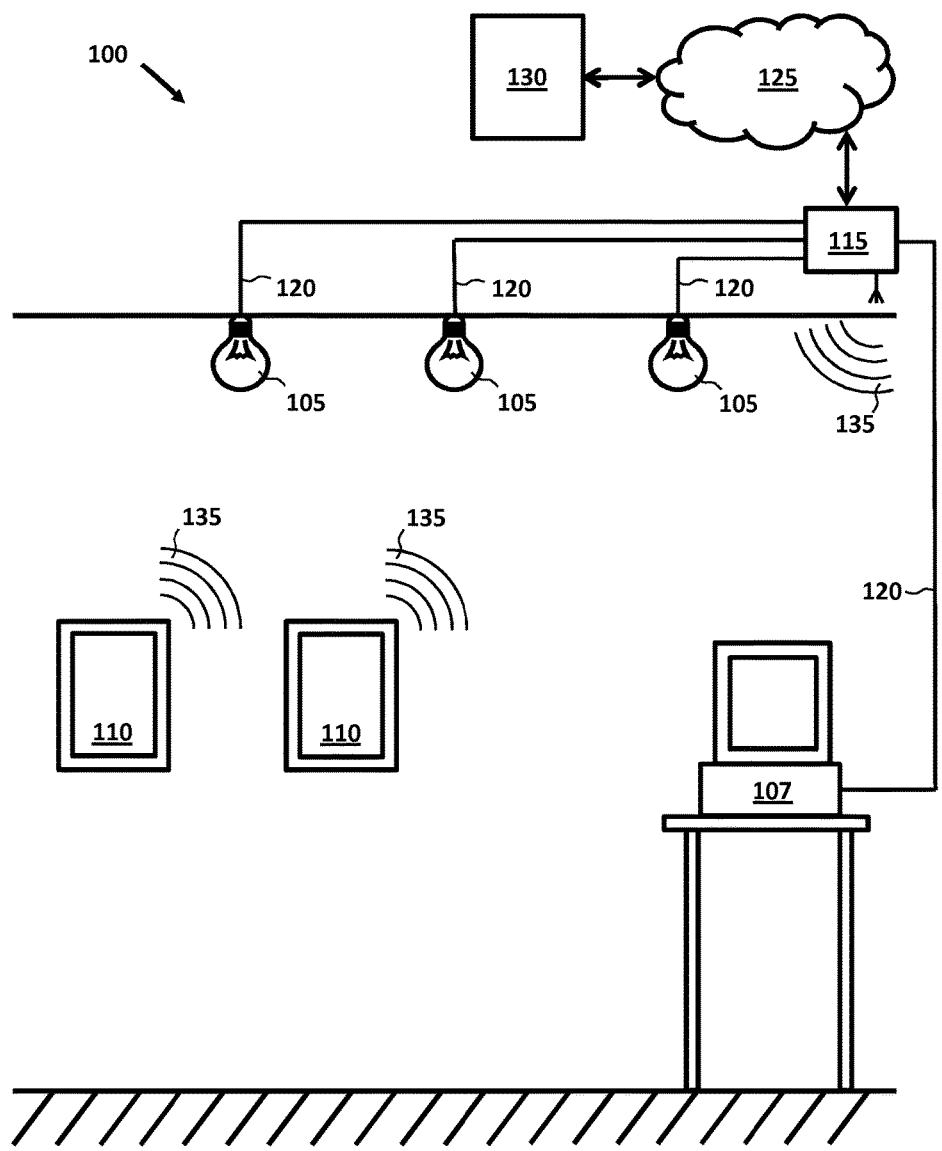
FIG. 1 is a diagram of a lighting system and user equipment in communication therewith, according to embodiments of the invention.

In overview, and with reference to FIG. 1, in an embodiment of the invention a lighting system 100 comprises a plurality of light fixtures 105, a system controller 107 and a wireless access point 115 (hereinafter, the "WAP 115"). The lighting system 100 is connected via one or more internal and/or external networks 125 to a remote server 130.

Each of the light fixtures 105 comprises one or more LED-based light sources, and is part of a respective ceiling-mounted light fixture arranged to emit light generally downwards. The light fixtures 105 are connected to the WAP 115 via a wired channel 120, which comprises respective Ethernet cables in this embodiment.

The system controller 107 is connected to the WAP 115 via the wired channel 120, and is configured to communicate thereby with all of the light fixtures 105. The system controller 107 is suitable for controlling the light fixtures 105 individually, in groups of any two or more, or all at once.

As shown in FIG. 1, in accordance with an embodiment of the invention there may be one or more instances of user equipment 110 in the vicinity of the lighting system 100, which is/are enabled to communicate with the lighting system 100. The user equipment 110 is enabled to communicate with the WAP 115 via a wireless channel 135, which is a WiFi channel in this embodiment. Thus the user equipment 110 can communicate with the system controller 107, e.g. to request control of the lighting system.

Figure 2:
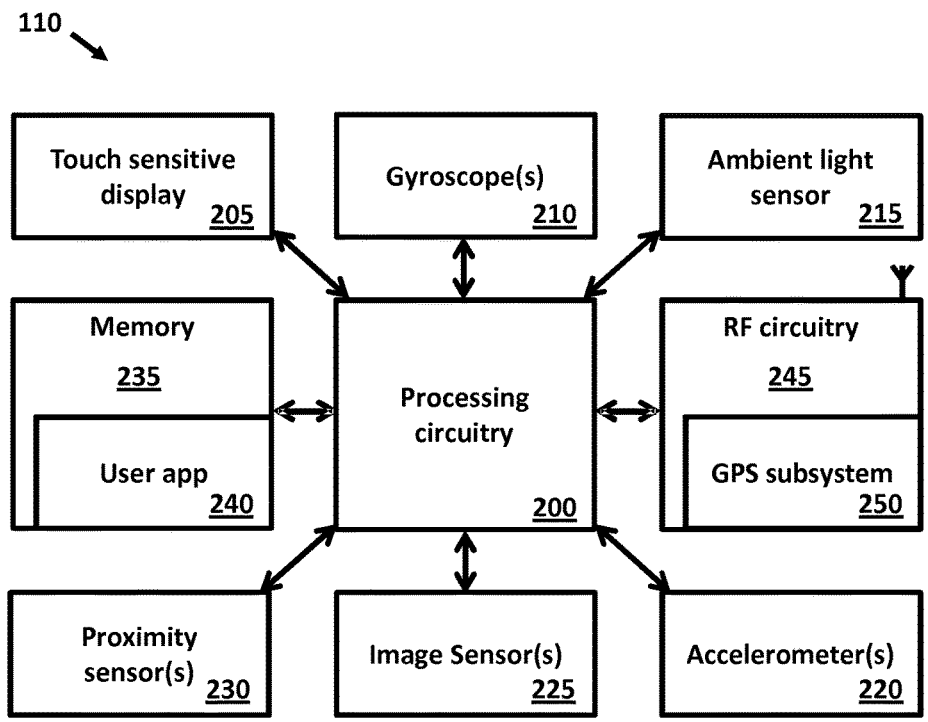
FIG. 2 is a diagram showing the user equipment of FIG. 1 in more detail.

As shown in FIG. 2, the user equipment 110 (which may be a smartphone or a tablet computer, for example) comprises processing circuitry 200 which is communicatively coupled to a touch-sensitive display 205 and to a plurality of sensors. The plurality of sensors comprises: one or more gyroscopes 210; one or more ambient light sensors 215; one or more accelerometers 220, including a three-axis accelerometer in this embodiment; one or more magnetometers (not shown); one or more image sensors 225, which includes an integrated CCD camera in this embodiment; and one or more proximity sensors 230. The processing circuitry 200 is also communicatively coupled to radiofrequency ('RF') circuitry 245, which enables wireless communication via the wireless channel 135, and which includes a GPS subsystem 250.

The user equipment 110 further comprises memory 235, which is communicatively coupled to the processing circuitry 200. The memory 235 comprises, in addition to a number of conventional files and applications, a lighting control application 240 (hereinafter, the label 'user app' will be used for convenience, which should not be interpreted as a descriptive label).

When executed by the processing circuitry 200, the user app 240 causes the user equipment 110 to carry out a method of controlling one or more of the light fixtures 105, via the system controller 107.

When the user app 240 is launched, the user equipment 110 obtains the identities of the light fixtures 105 using conventional discovery methods, via the wireless channel 135.

Figure 3:
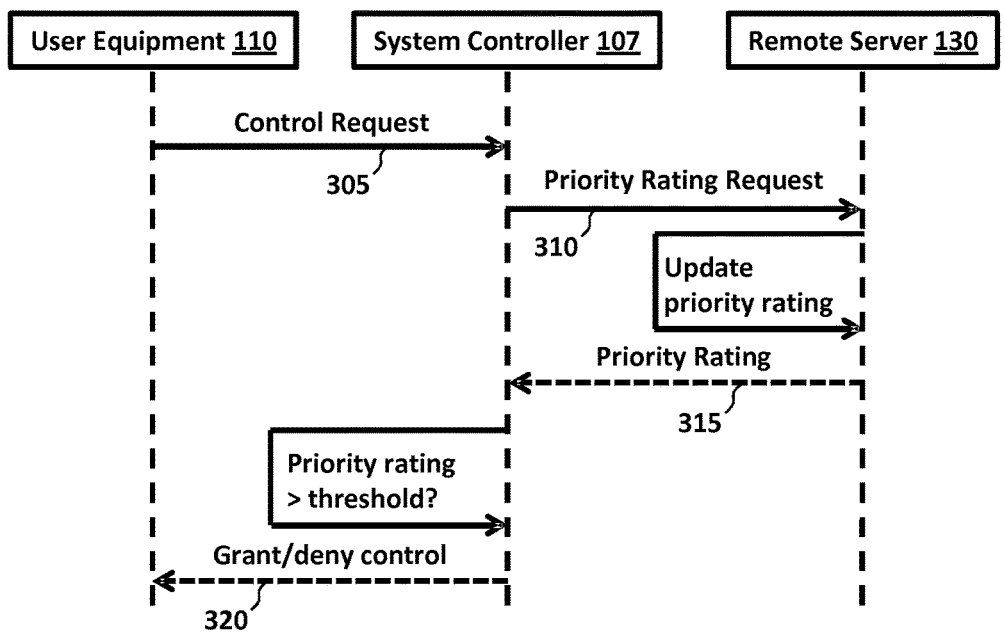
FIG. 3 is a diagram showing interactions between the user equipment, system controller and remote server of FIG. 1, during a process of granting access of the lighting system to the user equipment.

Referring now to FIG. 3, in response to identifying the light fixtures 105, the user equipment 110 sends a control request 305 to the system controller 107. The control request 305 comprises an identity of a user of the user equipment 110, which for instance may be the mac address of the user equipment 110 (which is assumed to be registered property of the user).

Figure 4:
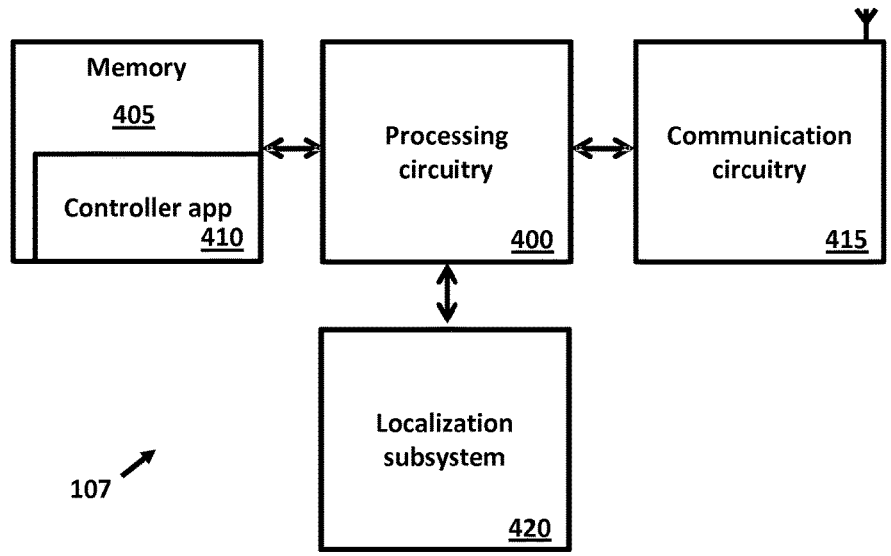
FIG. 4 is a diagram showing the system controller of FIG. 1 in more detail.

Turning briefly to FIG. 4, the system controller 107 comprises processing circuitry 400 connected to communications circuitry 415, whereby it receives the control request 305 from the user equipment 110. The system controller 107 further comprises memory 405, which is communicatively coupled to the processing circuitry 400. The memory 405 comprises, in addition to a number of conventional files and applications, a lighting control application 410 (hereinafter, the label 'controller app' will be used for convenience, which should not be interpreted as a descriptive label). When executing the controller app 410, the system controller 107 is configured to control the light fixtures 105 in dependence on or more control requests received from the user equipment 110, as will be described in more detail below.

Referring again to FIG. 3, in response to receiving the control request from the user equipment 110, the system controller 107 sends a priority rating request 310 to the remote server 130. The priority rating request 310 comprises the identity of the user, which the system controller 107 obtained from the control request 305.

Figure 5:
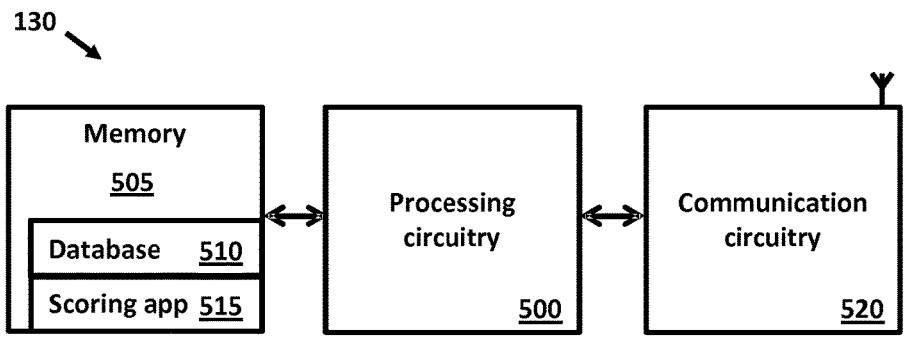
FIG. 5 is a diagram showing the remote server of FIG. 1 in more detail.

Turning briefly to FIG. 5, the remoter server 130 comprises processing circuitry 500 connected to communications circuitry 520, whereby it receives the priority rating request 310 from the system controller 107. The remoter server 130 further comprises memory 505, which is communicatively coupled to the processing circuitry 500. The memory 505 comprises, in addition to a number of conventional files and applications, a lighting control application 515 (hereinafter, the label 'server app' will be used for convenience, which should not be interpreted as a descriptive label) and a database 510 of users and their respective 'priority ratings'. When executing the server app 515, the remote server 130 is configured to dynamically update the database 510, as will be described in more detail below.

Referring again to FIG. 3, in response to receiving the priority rating request 310 from the system controller 107, the remote server 130 updates the priority rating associated with the user in the database 510. (The remote server 130 obtains the identity of the user from the priority rating request 310.) The remote server 130 is configured to create a database entry for the user, including a priority rating, if one does not already exist; hereinafter, a reference to an/the "existing priority rating" should be interpreted so as to include such a newly-created priority rating.

Figure 6:
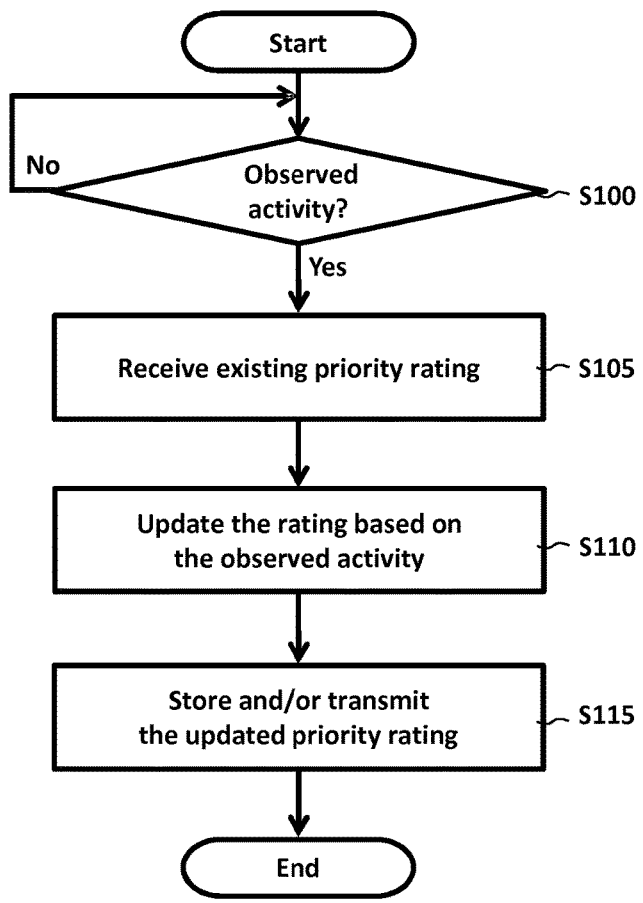
FIG. 6 is a flowchart showing steps carried out by the remote server of FIGS. 1 and 5, to dynamically update a priority rating associated with a user of the user equipment, in accordance with an embodiment of the invention.

As shown in FIG. 6, the remote sever 130 is configured to discern 5100 and respond to observed activity linked to the user. By receiving the priority rating request 310, the remote server 130 obtains an indication that the user has arrived in, and therefore is present in, a predefined area associated with the lighting system 100. The remote server 130 treats this as an observed activity linked to the user, and in response proceeds to retrieve S105 from the database 510 (or receive in any other suitable manner) an existing priority rating associated with the user in order to update it.

Next the remote server 130 updates S110 the existing priority rating based on the observed activity. This updating may involve simply incrementing the existing priority rating, or it may involve increasing the existing priority rating on a sliding scale based on which type of activity is observed. For instance, if the user is present in the predefined area associated with the lighting system 100 at a prioritized time of day, e.g. before 8 am, then the existing priority rating may be increased by more than it would have been at other times of the day. This may act as an incentive to arrive early. As another example, if the user is present in a prioritized part of the predefined area, e.g. in a particular office of an office building, then the existing priority rating may be increased by more than it would have been for other parts of the office building.

The remote server 130 then stores S115 the updated priority rating in memory, and sends S115 the updated priority rating 320 to the system controller 107 as a reply to the priority rating request 310.

Referring again to FIG. 3, in response to receiving the updated priority rating 315 from the remote server 130, the system controller 107 compares the updated priority rating 315 with a threshold. In this embodiment the threshold is a respective priority rating associated with another user, which may have been obtained in the same manner as described above, e.g. in response to the other user sending a control request to the system controller 107.

If the updated priority rating 315 is above the threshold, the system controller 107 sends a grant-control message 320 to the user equipment 110 as a reply to its control request 305. The grant-control message 320 comprises a 'list of privileges', indicating which of the light fixtures 105 can be controlled and to what extent. For instance, the user may be allowed to control only a subset of the light fixtures 105, and only their dim levels.

Figure 7:
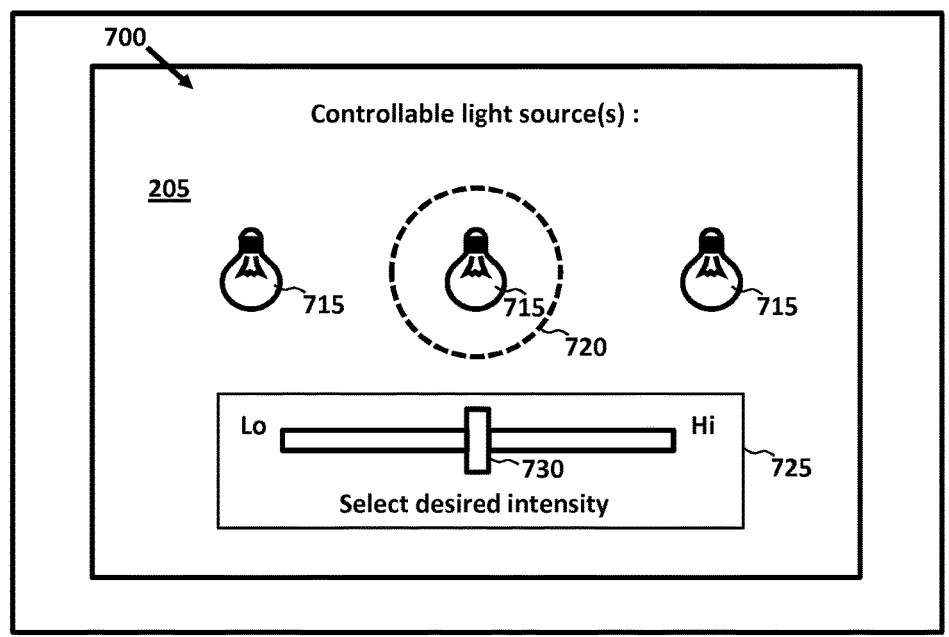
FIG. 7 is a diagram of a user interface, presented on a screen of the user equipment of FIGS. 1 and 2, for enabling a user to indicate a preferred setting for the lighting system, in accordance with an embodiment of the invention.

In response to receiving the grant-control message 320, the user equipment 110 presents on its display 205 a user interface 700 for controlling the light fixtures 105, as shown in FIG. 7.

The user interface 700 comprises a representation 715 of the light fixtures 105, which in this embodiment comprises a respective icon for each of the light fixtures 105, shown as light bulb icons in FIG. 7. If the list of privileges indicates that the user is not allowed to control some of the light fixtures, the corresponding icons are displayed in such a way as to convey this to the user, e.g. they may be 'greyed out'.

The user can then select one of the light fixtures 105 to control by touching the display 205 where the representation 715 corresponding to that light fixture 105 is shown. In response to the user selection, the user interface 700 shows an indication 720 of which light fixture 105 has been selected. In this embodiment the indication 720 is an icon overlay, shown in FIG. 7 as a dashed line encircling the icon 715 corresponding to the selected one of the light fixtures 105.

The user interface 700 also comprises a control object 725 whereby one or more light settings of the selected light fixture 105 can be adjusted. In this embodiment the control object 725 comprises a slider 730, which the user can 'drag' in order to indicate a desired light setting. As shown in FIG. 7, the position of the slider 730 represents a current dim level of the selected light fixture 105, and can be dragged towards "Lo" or towards "Hi" to dim or brighten the selected one of the light fixtures 105, respectively.

In response to the user indicating a desired light setting for one or more of the light fixtures, via the user interface 700, the user equipment 110 sends a control message to the system controller 107. The control message identifies the one or more light fixtures and the desired light settings for each.

The system controller 107, having granted control of the lighting system 100 to the user equipment 110, will interpret the control message and provide appropriate control signals to the relevant light fixtures.

Alternatives

While an embodiment of the invention has been illustrated and described in detail in the drawings and foregoing description, such illustration and description are to be considered illustrative and not restrictive; the invention is not limited to the disclosed embodiments.

For example, the user equipment described above may be a smartphone or a tablet computer, but in other embodiments it could be any other suitable user device. For instance, suitable user devices may include laptop computers, portable DVD players, portable audio players or the like.

In various embodiments, the identity of a user may alternatively/additionally be obtained by other means. For instance, the user may enter an identifier (e.g. a username, user ID and/or password) into a wall-mounted control panel suitable for controlling the lighting system, or other shared-access system. The user may 'swipe' his or her ID card, or other near field communications (NFC) device, through/over a reader from which the identity of the user is then obtained.

In various embodiments, the user equipment may communicate directly with the remote server (through a cellular link, for example), rather than via the system controller. In which case, the remote server may then communicate with the system controller, or even with the light fixtures themselves if they have network connectivity.

In various embodiments, the above-described functions of the remote server (e.g. updating the priority rating associated with a user) and the system controller (e.g. comparing the priority rating with a threshold) are integrated into a single computer apparatus. The computer apparatus is thus arranged to obtain via an internal process the priority rating associated with a user, rather than receiving it from a separate computer apparatus such as the remote server. The computer apparatus may be part of the lighting system, or other shared-access system, or it may be 'in the cloud' i.e. part of an external network to which the lighting system, or other shared-access system, is connectable. In an embodiment the computer apparatus is, or is part of, the user equipment.

In various embodiments, the system controller may perform 'arbitration' whereby granting control of the lighting system, or other shared-access system, entails allowing the user equipment to directly control the lighting system. Alternatively, as described in detail above, granting control to a user may mean allowing the user to indirectly control the lighting system, or other shared-access system. For example, the system controller will control the lighting system but in dependence on preferred settings of the user, either received from the user equipment or stored in a memory accessible by the system controller.

In various embodiments, the threshold with which a user's priority rating is compared is derived from a priority ratings associated with another user, or from respective priority ratings associated with a plurality of other users. For example, the threshold may comprise a weighted version of another user's priority rating, biased upwards or downwards in dependence on factors such as a system administrator making manual (perhaps temporary) changes to allow more or fewer users to control the system. The threshold may comprise the mean, median or mode (or other suitable representative value) of the respective priority ratings of a plurality of other users, such as a particular class or group of users. In which case, the threshold should increase in response to an overall increase in the respective priority ratings of its users.

In various embodiments, updating the priority rating associated with a user is done dynamically in response to obtaining an indication of one or more observed activities of the user. For instance, the user equipment may be configure to use its GPS subsystem to determine its location and then communicate that location to the system controller via any suitable means; thus the system controller may obtain an indication that the user equipment is present in a predefined area associated with the lighting system, or other shared-access system, which may trigger the updating.

In various embodiments, the one or more observed activities comprises making one or more purchases or other financial transactions linked to the shared-access system. For instance, a user may book and pay for a hotel room for a night, e.g. at the hotel reception (perhaps using an NFC-enabled user device) or via the Internet, which causes the user's priority rating to be updated for the lighting system, or other shared-access system, in the hotel room. Thus that an indication that a purchase linked to the shared-access system has been made, and that the purchase is associated with an account linked to the user, is obtained from the system which processed the payment in respect of booking the room.

In various embodiments, a user's priority rating could have a (weighted) contribution from his or her contacts/connections. The user may have an indirect connection to a location associated with the shared-access system, such as being connected via someone with a direct connection to that location, in which case a weighting based on the directly-connected person's priority rating could be applied.

In various embodiments, a user may have multiple priority levels, whereby control of the shared-access system may be granted to more than one user concurrently, with different users controlling different aspects of the shared-access system. In a lighting system, for example, each of several users may be able to control different ones of the light fixtures, or one user may be able to control the color of the emitted light while a different user is able to control the intensity of the emitted light.

In various embodiments, a user may have different priority levels for different parts/zones/subsystems of a shared-access system. In a hotel lighting system, for example, a hotel guest may have a lower priority rating in the hotel lobby than in his or her hotel room.

In various embodiments, the light fixtures may be any suitable arrangement of one or more lighting units in a particular form factor, assembly, or package. A given lighting unit may include one or more light sources of same or different types (as noted above), and may have any one of a variety of mounting arrangements for the light source(s), enclosure/housing arrangements and shapes, and/or electrical and mechanical connection configurations. Additionally, a given lighting unit may be associated with (e.g., include, be coupled to and/or packaged together with) various other components (e.g., control circuitry) relating to the operation of the light source(s).

In various embodiments, the IP-enabled light fixtures described above could be replaced or supplemented by other addressable light fixtures, e.g. DALI- and/or DMX-controlled light fixtures. Some embodiments may comprise non-addressable light fixtures.

In various embodiments, the light sources may potentially comprise any suitable sources of light, such as LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio-luminescent sources, and luminescent polymers.

In various embodiments, the memory in the user equipment, in the system controller and in the remote server may be any suitable storage media, such as one or more of: volatile and non-volatile computer memory such as RAM, PROM, EPROM, and EEPROM, floppy disks, compact disks, optical disks, magnetic tape, etc. Various storage media may be fixed within the processor and/or controller, or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measures cannot be used to advantage.

A computer program may be stored/distributed on a suitable computer readable medium, such as an optical storage medium or a solid-state medium supplied together with or as part of other hardware, but may also be distributed via other computer program products such as Internet/intranet downloads or via other wired or wireless telecommunication systems.

Any reference signs in the claims should not be construed as limiting the scope.

The invention claimed is:

1. A method of controlling a shared-access lighting system, said method being performed by at least one hardware processor and comprising:
   obtaining an identity of a user;
   obtaining a priority rating associated with the user, wherein the priority rating is updated in response to and based on one or more observed activities of the user, the one or more observed activities being linked to the shared-access lighting system;
   comparing the priority rating with a threshold based on one or more observed activities of the user, the threshold comprising a requisite minimum priority rating irrespective of priority ratings of other users;
   granting control of at least a part of the shared-access lighting system to the user if the priority rating is above the threshold; and
   altering a light output of at least one light source of said lighting system in accordance with the control granted to the user.

2. The method of claim 1, wherein the one or more observed activities comprises being present in a predefined area associated with the shared-access lighting system.

3. The method of claim 2, further comprising:
   obtaining an indication that a user device associated with the user is present in the predefined area associated with the shared-access lighting system; and
   in response to obtaining the indication, updating the priority rating associated with the user based on the indication.

4. The method of claim 1, wherein the one or more observed activities comprises making one or more purchases linked to the shared-access lighting system, and/or to the environment in which the shared-access lighting system or a part thereof is located.

5. The method of claim 4, further comprising:
   obtaining an indication that a given purchase has been made which is linked to the shared-access lighting system, and that the given purchase is associated with an account linked to the user; and
   in response to obtaining the indication, updating the priority rating associated with the user based on said purchase.

6. The method of claim 1, wherein the one or more observed activities comprises becoming associated with the shared-access lighting system on an Internet-based networking site.

7. The method of claim 1, comprising granting control of at least a part of the shared-access lighting system to the user, to the exclusion of any other user, if the priority rating is above the threshold.

8. The method of claim 1, wherein the altering comprises automatically controlling said at least a part of the shared-access lighting system in accordance with predefined settings associated with the user.

9. The method of claim 1, wherein the granting control of at least a part of the shared-access lighting system to the user comprises enabling the user to provide one or more settings for controlling said at least a part of the shared-access lighting system.

10. The method of claim 9, wherein the one or more settings are indicative of at least one of: a dimming level; a color; and an illumination pattern.

11. A non-transitory computer-readable medium comprising a computer program comprising computer-interpretable instructions which, when executed by processing circuitry of a computing device, cause the computing device to carry out the method of claim 1.

12. A computing device for granting control of a shared-access lighting system, comprising:
   a communications subsystem for communicating with the shared-access lighting system, and for receiving one or more inputs from outside the shared-access lighting system;
   memory in which is stored a computer program; and
   processing circuitry connected to the communications subsystem and the memory, which by executing the computer-interpretable instructions of the computer program is configured to carry out the method of claim 1.

13. A shared-access lighting system comprising one or more light sources and the computing device of claim 12, wherein the computing device is connected to the one or more light sources for granting control thereof.

14. The method of claim 1, wherein the threshold comprises, or is derived from, a respective priority rating which is associated with another user.

* * * * *